US012705203B2

(12) United States Patent
Zimmermann et al.

(10) Patent No.: US 12,705,203 B2
(45) Date of Patent: Aug. 11, 2026

(54) INFRASTRUCTURE MANAGEMENT SYSTEM

(71) Applicant: ZPE Systems, Inc., Fremont, CA (US)

(72) Inventors: Arnaldo Zimmermann, Dublin, CA (US); Livio Ceci, Fremont, CA (US)

(73) Assignee: ZPE Systems, Inc., Fremont, CA (US)

( * ) Notice: Subject to any disclaimer, the term of this patent is extended or adjusted under 35 U.S.C. 154(b) by 102 days.

(21) Appl. No.: 18/179,407

(22) Filed: Mar. 7, 2023

(65) Prior Publication Data

US 2023/0289318 A1 Sep. 14, 2023

Related U.S. Application Data

(60) Provisional application No. 63/318,206, filed on Mar. 9, 2022.

(51) Int. Cl.
*G06F 13/42* (2006.01)
*G06F 13/38* (2006.01)

(52) U.S. Cl.
CPC ........ *G06F 13/4282* (2013.01); *G06F 13/382* (2013.01); *G06F 2213/0016* (2013.01); *G06F 2213/0042* (2013.01)

(58) Field of Classification Search
None
See application file for complete search history.

(56) References Cited

U.S. PATENT DOCUMENTS 10,331,579 B2 * 6/2019 Gupta ................ G06F 13/4068
10,387,346 B2 * 8/2019 Ni ...................... G06F 12/0246
10,430,225 B1 * 10/2019 Harland .............. G06F 9/45558
10,860,990 B2 * 12/2020 Bowles ................... H04W 8/22
11,181,962 B2 * 11/2021 Kwon .................. G06F 1/3215
12,093,205 B2 * 9/2024 Chen ..................... G06F 13/382
2017/0017595 A1 * 1/2017 Schnell ............... G06F 13/4286
2017/0031860 A1 * 2/2017 Hulbert ............... H04L 63/0853
2017/0169401 A1 * 6/2017 Beane ................... H04W 24/00
2017/0286349 A1 * 10/2017 Edirisooriya ....... G06F 13/4282
2018/0225230 A1 * 8/2018 Litichever .............. G06F 21/56
2020/0249965 A1 * 8/2020 Shturma ................ G06F 9/451
2021/0174312 A1 * 6/2021 Bowles ................... H04W 8/22
2021/0389371 A1 * 12/2021 Liew ................ G01R 31/31705
2022/0053394 A1 * 2/2022 Kim ...................... H04W 76/34
2022/0132524 A1 * 4/2022 Mueck ............. H04W 72/1215
2022/0312196 A1 * 9/2022 Guo .................... H04W 12/033
2023/0169019 A1 * 6/2023 Cannata ............. G06F 13/4282 710/105
2023/0259484 A1 * 8/2023 Chung .................... G06F 13/20 710/313
2023/0281604 A1 * 9/2023 Robell ................. G06Q 30/018
2024/0111696 A1 * 4/2024 Matthies ........... G05B 19/0423
2024/0220788 A1 * 7/2024 Duong .................... G06N 3/08

* cited by examiner

*Primary Examiner* — Henry Tsai
*Assistant Examiner* — Christopher A Bartels
(74) *Attorney, Agent, or Firm* — HORIZON IP PTE. LTD.

(57) ABSTRACT

An infrastructure management (IM) system including first and second communication modules. A user device is communicatively coupled to the first communication module and a target server is communicatively coupled to the second communication module via a USB port. One or more first messages may be communicated over the USB port to the target server using a first communication protocol. One or more second messages may be communicated over the USB port to the target server using a second communication protocol.

20 Claims, 13 Drawing Sheets

202
D
306
307a
307b
320a
320b
G
310
302
304
109
212
213
208

310
213
320a
311c
318
212
311d
306
307a
311b
308
311a
109

208
109
212
320a
307a
310
302
306
302
213
209

H
302

| Pin Number | Original Signal | Remapped Signal |
|---|---|---|
| 1 | VBUS | VBUS |
| 2 | D | D- |
| 3 | D+ | D+ |
| 4 | GND | GND |
| 5 | StdA_SSRX- | SCL |
| 6 | StdA_SSRX+ | SDA |
| 7 | GDN_DRAIN | PRESENT |
| 8 | StdA_SSTX- | TX |
| 9 | StdA_SSTX+ | RX |

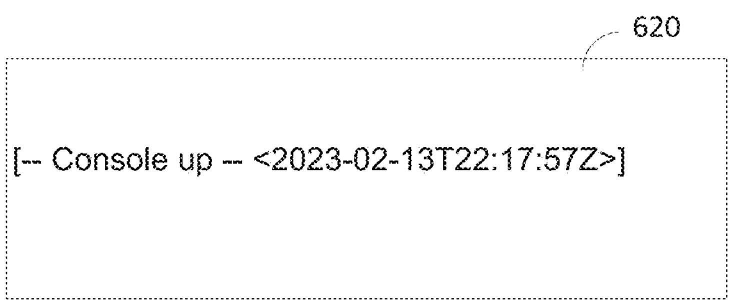

```
[-- logic B detected --]
[-- logic A detected --]
[-- Target ID 0xe1 -- slot1 --]
[-- Target ID 0xe3 -- description n.a. --]
[-- Target ID 0xe3 -- slot3 --]
[-- Target ID 0xe0 -- description n.a. --]
[-- Target ID 0xe0 -- bmc --]
[-- Target ID 0xe0 -- bmc --]
--- SYS_info
FRU:bmc
BMC_FW_ver:fby3-v2-2-,41,1Board_ID:00
Battery: NA
MCUb1_ver: NA
MCU_ver:
BIC_ver:NA
=== Cri SEL
BMC AC lost

10 Status: P10 [Power] = 0 [RST_BTN_N]
10 Status: P11 [Power] = 0 [PWR_BTN_N]
10 Status: P12 [Status] = 0 [PWRGD_SYS_PWROK]
10 Status: P13 [Status] = 0 [RST_PLTRST_N]
```

Figure 7:
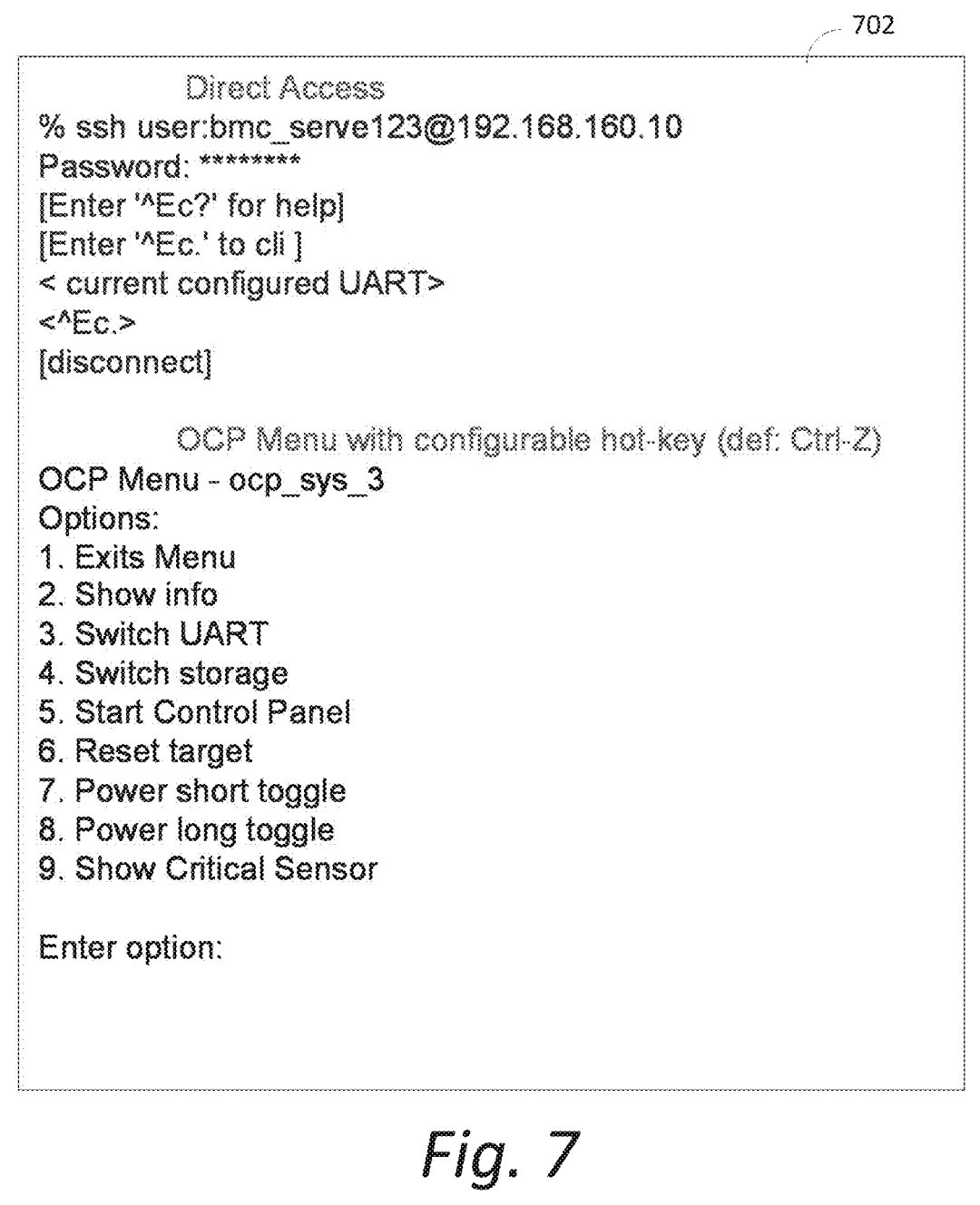

Direct Access

% ssh user:bmc_serve123@192.168.160.10
Password: ********
[Enter '^Ec?' for help]
[Enter '^Ec.' to cli ]
< current configured UART>
<^Ec.>
[disconnect]

OCP Menu with configurable hot-key (def: Ctrl-Z)

OCP Menu - ocp_sys_3
Options:
1. Exits Menu
2. Show info
3. Switch UART
4. Switch storage
5. Start Control Panel
6. Reset target
7. Power short toggle
8. Power long toggle
9. Show Critical Sensor Enter option:

Managed Devices :: Devices

Search:

810

Access: [ Licensed | Used | Leased | Available ]

Monitoring: [ Licensed | Used | Leased | Available ]

808

902

```
[admin@nodegrid /]# cd settings/devices
[admin@nodegrid devices]# show
  name       connected through  type        access    monitoring
 =========  =================  ===========  ========  ======
=======
 ocp_sys_1  ocpS2-1           usb_ocp     enabled   not supported
 ocpS2-2    ocpS2-2           usb_ocp     disabled  not supported
 ocpS2-3    ocpS2-3           usb_ocp     disabled  not supported
 ocpS2-4    ocpS2-4           usb_ocp     disabled  not supported
 ocpS2-5    ocpS2-5           usb_ocp     disabled  not supported
 ocpS2-6    ocpS2-6           usb_ocp     disabled  not supported
 ocpS2-7    ocpS2-7           usb_ocp     disabled  not supported
 ocpS2-8    ocpS2-8           usb_ocp     disabled  not supported
 ocp_sys_2  ocpS2-9           usb_ocp     enabled   not supported
...
[admin@nodegrid devices]# cd ocp_sys_1/access/
[admin@nodegrid access]# show
name: ocp_sys_1
usb port: ocpS2-1
description =
address_location =
coordinates =
web_url =  http://%P
launch_url_via_html5 = yes
username =
password = ********
allow_pre-shared_ssh_key = no
baud_rate = 57600
parity = None
flow_control = None
data_bits = 8
stop_bits = 1
rs-232_signal_for_device_state_detection = None
enable_device_state_detection_based_in_data_flow = no
```

*Fig. 9*

INFRASTRUCTURE MANAGEMENT SYSTEM

CROSS-REFERENCE TO RELATED APPLICATION

This application claims the benefit of U.S. Provisional Application No. 63/318,206, filed Mar. 9, 2022, entitled "Universal Serial Bus (USB) Port Module," which is hereby incorporated by reference in its entirety.

BACKGROUND

The Open Compute Project (OCP) has established new standards for devices that may be used in open and energy-efficient data centers. OCP-based technologies are designed to be as scalable and efficient as possible. The OCP has issued a number of specifications for computing devices, such as a debug card for monitoring and troubleshooting errors in OCP servers. For example, the OCP debug card is a device with a liquid crystal display (LCD) to display debug messages on the card. The dimensions of the OCP debug card are typically 70.55 mm by 48 mm by 17.1 mm.

Each OCP debug card is designed to be plugged into the baseboard of a single server via a universal serial bus (USB) port. When several servers on a rack need to be debugged, multiple bulky OCP debug cards are required to be physically connected to the servers and locally controlled. Moreover, the OCP debug card does not provide any internal memory for storing device files or any remote access over a network. In order to connect a USB 2.0 storage device to the baseboard of the server via the USB port, the OCP debug card typically needs to be unplugged from the baseboard of the server or a USB 2.0 storage device needs to be plugged into the OCP debug card while the OCP debug card is plugged into the baseboard of the server. Remote access of such USB storage devices is typically not possible in conventional systems.

In order to access the console port (e.g., baseboard management controller or BMC) of the baseboard of the server or of the host(s), a universal asynchronous receiver-transmitter (UART) cable is connected to the OCP debug card. The OCP debug card is plugged into the baseboard of the server via the USB port and a selection between BMC or UART host(s) is typically made on the OCP debug card via the menu button. Remote access of such console port is typically not possible in conventional systems.

In order to query or send intelligent platform management bus (IPMB) messages to the baseboard of the server via the USB port, a selection is typically made on the OCP debug card via the menu button. Remote visualization of IPMB messages, storing of the messages on OCP debug card or remotely sending new IPMB messages is typically not possible in conventional systems.

BRIEF DESCRIPTION OF THE DRAWINGS

FIG. 6B shows an exemplary data log;

FIG. 6C shows an exemplary event log;

FIG. 7 shows an exemplary command-line interface (CLI) for managing, accessing and controlling a target server via a USB port;

FIG. 9 shows an exemplary command-line interface (CLI) for device configuration.

DETAILED DESCRIPTION

Figure 1:
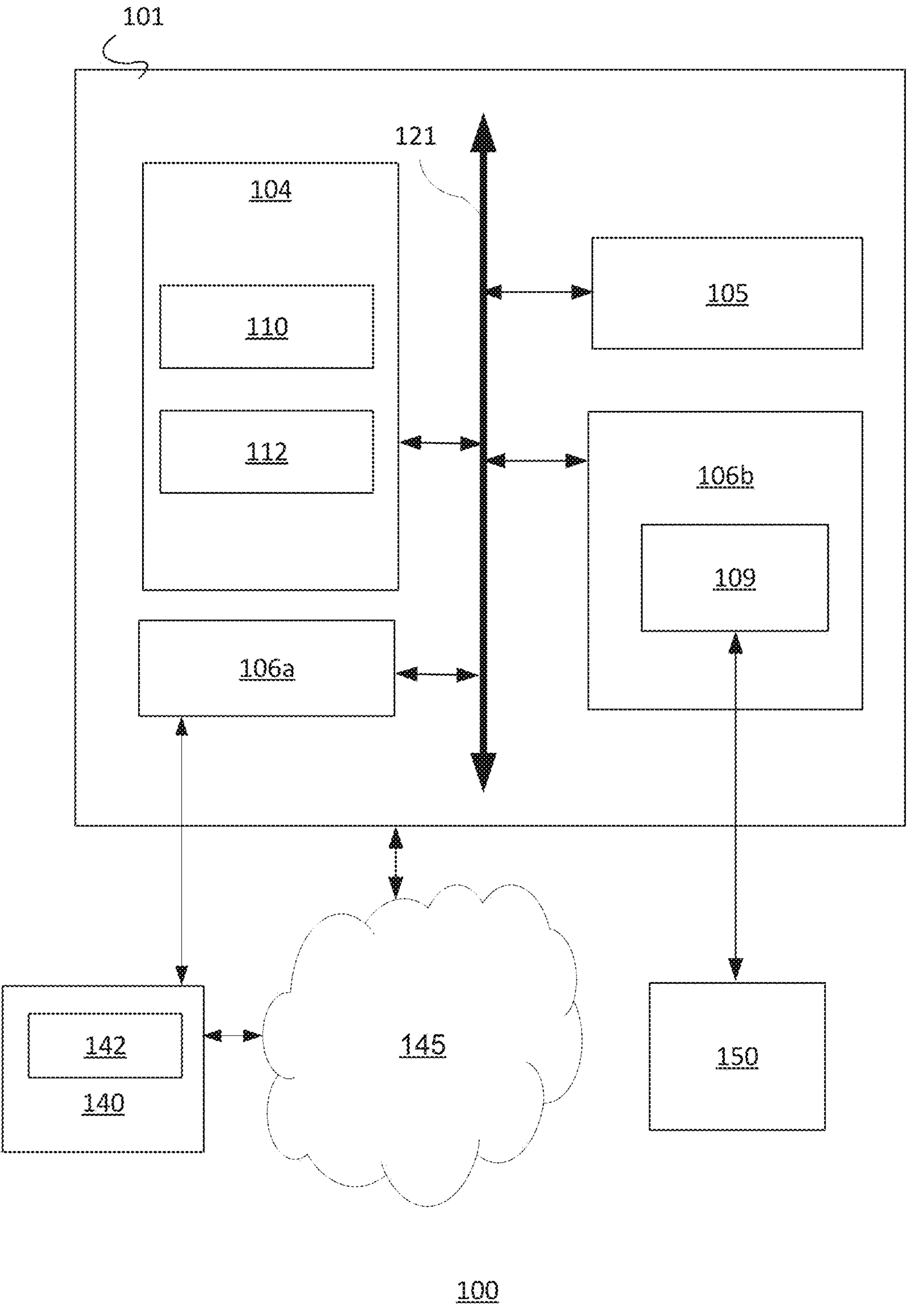
FIG. 1 illustrates an exemplary cloud-based communication system.

Some of the various embodiments of the present invention relate to infrastructure management systems, and more particularly to a data center infrastructure management system (s) configured to process network communication of data center component(s). Various embodiments relate to a data center infrastructure configured to process network communication from data center component(s) (e.g., information technology or IT devices) and employ the device information to determine an action to be performed on data center component(s) in an infrastructure management system.

A device is a machine and/or component that may attach to a computer and/or computer network. Examples of devices include disk drives, printers, displays, mice, and modems. These particular devices may fall into a category of peripheral devices separate from a main computing device. Other example devices may be non-peripheral devices such as IT devices. Many devices, whether peripheral or not, may employ a program called a device driver that may act as a translator, converting general commands from an application into specific commands that the device understands.

An IT device is an "Information Technology" device related to computing technology, comprising, but not limited to: data center devices, networking devices, hardware devices, software operating in combination with a hardware IT device, Internet devices, and/or the like. Some IT devices may employ virtual devices operating on specially configured hardware. Additional examples of IT devices include servers, compute nodes, routers, switches, firewalls, load balancers, networking nodes, storage nodes, power nodes, cooling nodes, storage appliances, power appliances, cooling appliances, network appliances, virtual appliances, virtual machines, system hardware with network access, hosted module within a system, combinations thereof, and/or the like.

A virtual device may employ a software virtual device driver operating on a hardware computing device configured to emulate hardware and/or other devices so that multiple applications may, for example, access hardware interrupt channels, hardware resources and memory without causing conflicts. Computer hardware may require communication and control processes for devices and/or hardware components to access each other in a controlled manner. These processes may be defined as device drivers, which may comprise code that an application may employ to access hardware and/or external software resources. Some example virtual devices may be configured for use in multitasking operating systems. In such an example, a device driver may be controlled by an operating system's virtual device driver manager and shared by applications running within that kernel. A virtual device driver may pass interrupt and memory requests through the kernel, which in turn may allocate resources as required.

An agent may comprise a computer program that acts for a user or other program in a relationship of agency, which derives from the Latin agere (to do): an agreement to act on one's behalf. Such "action on behalf" of implies the authority to decide which, if any, action is appropriate. Some agents may comprise, but are not limited to: intelligent agents (in particular exhibiting some aspect of artificial intelligence, such as learning and reasoning), autonomous agents (capable of modifying the way in which the agent achieves objectives), distributed agents (being executed on physically distinct computers), multi-agent systems (distributed agents that do not have the capabilities to achieve an objective alone and thus must communicate), mobile agents (agents that can relocate their execution onto different processors), and/or the like.

Some of the various embodiments may communicate with virtual (in combination with configured hardware) and/or physical IT devices such as compute nodes, networking nodes, storage nodes, power nodes, cooling nodes, other IT devices, combinations thereof, and/or the like. An infrastructure management system may automatically perform an action on IT device(s)—based at least in part, by an IT device information. The nature of the interaction between infrastructure management system(s) and IT device(s) may be regulated by the type of device itself to dictate network protocols natively supported by the IT device(s). The type of IT device(s) may also be used to identify a class or type of action that may apply for IT device(s) available in a network.

One aspect of the present framework provides a USB port module that may be removably inserted into an infrastructure management (IM) system. The USB port module provides USB ports that each individually functions as a debug port for a target server (e.g., OCP server). Each USB port on a USB 3.0 Type A connector may support individual I2C (or IPMB) signals, individual UART serial bus signals and USB 2.0 bus signals. Other connector types may also be used. Additionally, each USB port may be connected to an optional individual USB 2.0 storage device that is located internally within the USB port module. Each USB 2.0 bus signal on the USB port module may operate independently in normal mode or passthrough mode to enable direct access to the internal USB 2.0 storage device by the target server.

Advantageously, the USB 2.0 storage device may be accessed by the target server without the need to physically unplug the USB port module. Additionally, the I2C (or IPMB) signals, the UART signals, the USB 2.0 storage device, USB port module and target server may be remotely accessed and/or configured by a user at a remote user device (or IT device). The present USB port module is compact and efficient, as it can provide a high density of OCP USB debugging ports for simultaneously debugging multiple target servers, including, but not limited to, querying for sensor data, sending messages, collecting log data over IPMB, or accessing a console port over the UART or sending and/or receiving files over to or from a USB 2.0 storage device. In some implementations, the USB port module is removably inserted into the housing of the IM system. Alternatively, the USB port module may be an non-removable component of the IM system. These and other exemplary features and advantages will be described in more details herein.

FIG. 1 illustrates an exemplary cloud-based communication system 100. The cloud-based communication system 100 includes an Infrastructure Management (IM) system 101 communicatively coupled to a user device 140 via a network (e.g., cloud-computing platform) 145. It should be appreciated that IM system 101 may also directly communicate (e.g., via a physical cable) with user device 140 without the network 145. IM system 101 may be placed in a location (e.g., branch office) that is remote from user device 140. For example, IM system 101 and user device 140 may be located in different offices, buildings, cities, states or countries. In some implementations, IM system 101 includes one or more non-transitory tangible machine-readable media 104 coupled to one or more processors 105 and one or more communication modules 106*a-b* via an input-output interface 121. Other components may also be included. For example, support circuits such as a network switch, cache, a power supply, and a communications bus may also be included.

IM system 101 may be communicatively coupled to one or more other target servers 150 via one or more USB ports 109. Target server 150 is an IT device, and may include a computer system (e.g., one or more processors coupled to one or more non-transitory computer-readable media). Target server 150 may be, for example, an OCP server. IM system 101 may also comprise a multitude of IT devices configured to cooperatively operate together. In some implementations, IM system 101 is communicatively coupled to other IT devices over a network. The network may include, but is not limited to, the Internet, an intranet, a connection to the Internet, a private cloud, interconnected data centers, a multi-nodal network, two or more computing devices connected using a Virtual Private Network (VPN), an on-premise network, an RS-232 serial network, an RS-485 serial network, a Local Area Network (LAN), a Wide Area Network (WAN), a Wi-Fi wireless network, an USB port, a Bluetooth™, cellular network, a combination thereof, and/or the like.

One or more communication modules 106*a-b* may be removably inserted or non-removably mounted in IM system 101 to provide desired functionalities. The desired functionalities may include, but are not limited to, one or more communication interfaces, USB port, network adapter (e.g., Local Area Network or LAN, Wide Area Network or WAN, Virtual Private Network or VPN, Wi-Fi, wireless WAN, Bluetooth™, cellular), storage (e.g., solid-state drive, dynamic random access memory, static random access memory, hard drive), cellular connectivity, satellite navigation, near field communication (NFC), digital radio, Wireless Gigabit Alliance (WiGig), power, compute functions, outlet functions, keyboard-video-mouse (KVM) switch, or a combination thereof. Communication modules 106*a-b* may include the necessary logic for functioning according to a respective standard specification, such as the M.2 (or Next Generation Form Factor), mSATA, Personal Computer Memory Card International Association (PCMCIA), and so forth.

The one or more communication modules 106*a-b* may provide one or more communication interfaces. The one or more communication interfaces may include at least one of the following: one or more null-modem serial ports; one or more Data Communications Equipment (DCE) serial ports; one or more Data Terminal Equipment (DTE) serial ports; one or more Cisco pinout serial ports; one or more Cyclades pinout serial ports; one or more straight-through serial ports; one or more cross-over serial ports; one or more RJ45 ports; one or more RS-232 serial ports; one or more RS-485 serial ports; one or more universal serial bus (USB) ports; one or more serial ports; one or more Local Area Network (LAN) ports; one or more Wide Area Network (WAN) ports; one or more Wi-Fi wireless Network ports; one or more input-output (I/O) ports, one or more Ethernet ports (e.g., gigabit Ethernet or GbE ports, copper, Power over Ethernet or PoE+, small form factor pluggable or SFP+, etc.), cellular, a combination of the above and/or the like.

In some implementations, communication module 106*b* is a USB port module. A USB port module has one or more USB ports 109 to provide debugging and storage functionalities. The one or more USB ports (e.g., 16, 32) 109 may be connected via USB cables to one or more target servers 150 (e.g., 16, 32). A high density of USB ports 109 may be provided to simultaneously debut multiple target servers 150. Each USB port 109 may function as a debug port for one or more target servers 150. Specifications of the target server 150 may conform to the OCP standardized server system specifications. IM system 101 and target server 150 may be mounted on the same or different server racks IM system 101 may further provide networking processing, data routing and other capabilities. IM system 101 may include at least one of the following: system hardware with network access, a server, a compute node, a router, a switch, a load balancer, a networking node, a storage node, a power node, a network appliance, a virtual appliance, a hosted module within a system, a combination thereof, and/or the like. Other IT devices coupled to IM system 101 may include, for example, a user device, a server, a compute node, a router, a switch, a load balancer, a networking node, a storage node, a power node, a cooling node, a storage appliance, a power appliance, a cooling appliance, a network appliance, a virtual appliance, a virtual machine, system hardware with network access, a hosted module within a system, a combination thereof, and/or the like.

Non-transitory computer-readable media 104 is any available media that can be accessed by IM system 101 and includes both volatile and nonvolatile media, and removable and non-removable media. By way of example, and not limitation, computer-readable media 104 may include computer storage media. Computer storage media includes both volatile and nonvolatile, and removable and non-removable media implemented in any method or technology for storage of information such as computer-readable instructions, data structures, program modules or other data. Computer storage media includes, but is not limited to, random access memory (RAM), read-only memory (ROM), electrically erasable programmable read-only memory (EEPROM), flash memory or other memory technology, compact disc read-only memory (CD-ROM), digital versatile disks (DVD) or other optical disk storage, magnetic cassettes, magnetic tape, magnetic disk storage or other magnetic storage devices, or any other medium which can be used to store the desired information and which can be accessed by IM system 101.

User device 140 is an IT device, and may include a computer system (e.g., workstation, mobile device, server) and appropriate peripherals, such as a keyboard and display device, and can be operated in conjunction with the entire system 100. For example, user device 140 may include one or more processors coupled to one or more non-transitory computer-readable media (e.g., computer storage or memory device), display device (e.g., monitor) and various input devices (e.g., mouse, touchpad or keyboard). In some implementations, user device 140 includes a user interface 142 stored in the non-transitory computer-readable media. User interface 142 may include, for example, a web browser, a graphical user interface, a command-line interface (CLI), or a combination thereof. User device 140 may also be an IT device operating autonomously without an user, such as an automation server, a data log server, a notification server, an event server or any other IT device.

In some implementations, user device 140 is communicatively coupled to IM system 101 over network 145. Network 145 may comprise, but is not limited to: a cloud-computing platform, the Internet, an intranet, a connection to the Internet, a private cloud, interconnected data centers, a multi-nodal network, two or more computing devices connected using a Virtual Private Network (VPN), an on-premise network, an RS-232 serial network, an RS-485 serial network, a Local Area Network (LAN), a Wide Area Network (WAN), a Wi-Fi wireless network, an USB port, a Bluetooth, cellular network, a combination thereof, and/or the like. User device 140 may also be directly coupled to communication module 106*a* of IM system 101 via, for example, a physical cable.

A cloud-computing platform generally refers to a group of networked computing resources (e.g., data storage, computing power, network resources, software resources) made available without active management by users. In some implementations, the cloud-computing platform represents a family of services hosted on one isolated server, multiple isolated servers, or on distributed servers that virtually appear to users to be a single server. The cloud-computing platform may be isolated or divided onto isolated different servers to facilitate the isolation, organization, and management of diverse families of functions that may be accessed by some authorized parties but not others.

The cloud-computing platform may include a management system stored in non-transitory computer-readable media in communication with one or more processors. The management system may provide one or more user interfaces through which users may interact with the cloud-computing platform. The one or more user interfaces may be accessed via user device 140 to, for example, remotely access the device user interface of IM system 101 and any IT device attached thereto. User device 140 and/or IM system 101 may connect to the cloud-computing platform via the Internet or other communication network, and may request access to one or more of the computing resources managed by the cloud-computing platform. User device 140 and/or IM system 101 may include web browser capabilities configured to communicate with the management system via the cloud-computing platform or otherwise through networks, which comprises any public network such as the Internet or World Wide Web or any public or private network as may be developed in the future.

The present technology may be implemented in various forms of hardware, software, firmware, special purpose processors, or a combination thereof, either as part of the microinstruction code or as part of an application program or software product, or a combination thereof, which is executed via the operating system. In one implementation, the techniques described herein are implemented as computer-readable program code tangibly embodied in one or more non-transitory computer-readable media 104. In particular, the present techniques may be implemented by management engine 110 and access and control engine 112 stored in one or more non-transitory computer-readable media 104 of IM system 101. The present techniques may also be implemented by user interface 142 provided on user device 140.

Figure 2A:
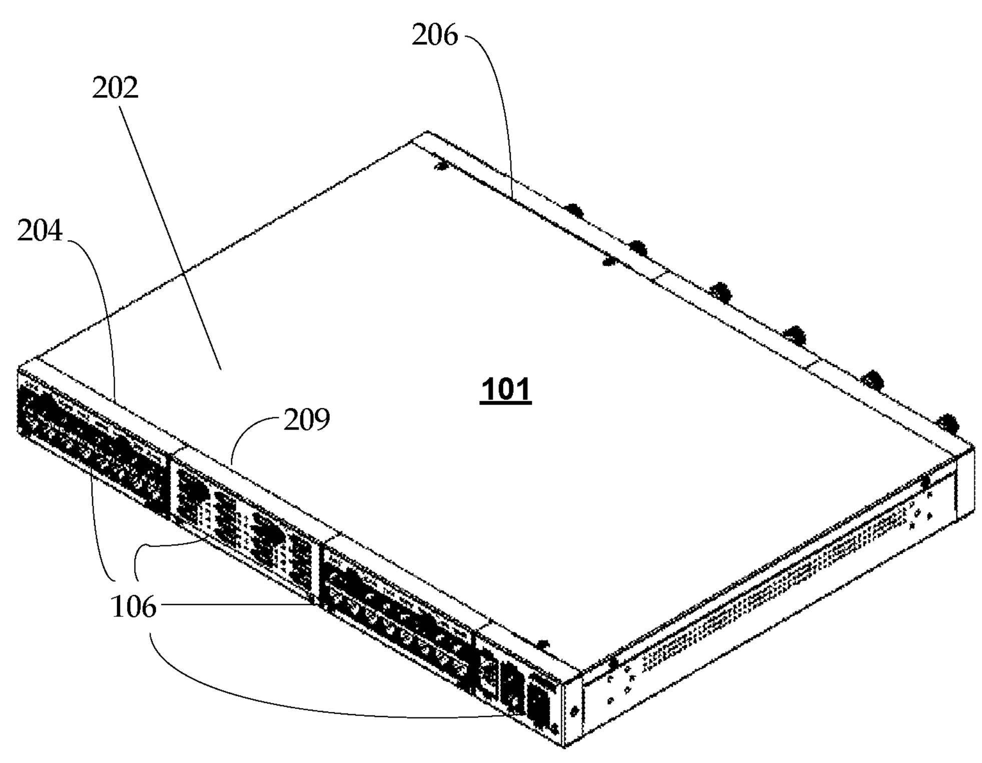
FIG. 2A illustrates a perspective view of an exemplary infrastructure management (IM) system.

FIG. 2A illustrates a perspective view of an exemplary infrastructure management (IM) system 101. The height of the housing 202 for the infrastructure management system may be one Rack-Unit (1 U) while mounted horizontally to the rack, less than one Rack-Unit (<1 U) while mounted horizontally to the rack, or zero Rack-Unit (0 U) while mounted vertically to the rack. The housing 202 may be configured to enclose one or more communication modules 106 and a circuit board having one or more processors, one or more planes for data and control, one or more non-transitory tangible machine-readable media, other semiconductor chips and/or components mounted thereon.

In some implementations, communication modules 106 include at least one USB port module 209. As shown, three communication modules 106, including the USB port module 209, may be removably inserted into modular slots along one side 204 of the housing 202. It should be appreciated that other configurations, such as more three communication modules 106 or multiple USB port modules 209, may also be removably inserted into the housing 202. Additionally, communication modules 106 may also be inserted into modular slots along the opposite parallel side 206 of the housing 202.

The communication modules 106 may include the necessary logic for functioning according to a respective standard specification, such as the M.2 (or Next Generation Form Factor), mSATA, Personal Computer Memory Card International Association (PCMCIA), and so forth. In some implementations, the infrastructure management system and communication modules 106 allow the user to select the desired functionality by removably inserting respective communication modules 106. If the user desires a different functionality, the user may simply remove a communication module 106 from a modular slot in the housing 202 and insert a different communication module 106. Alternatively, the communication modules 106 may be non-removably mounted in the IM system 101. It should be appreciated that an Operating System (OS) may automatically identify the type of communication module that is attached and may provide options to configure the different communication modules 106.

Figure 2B:
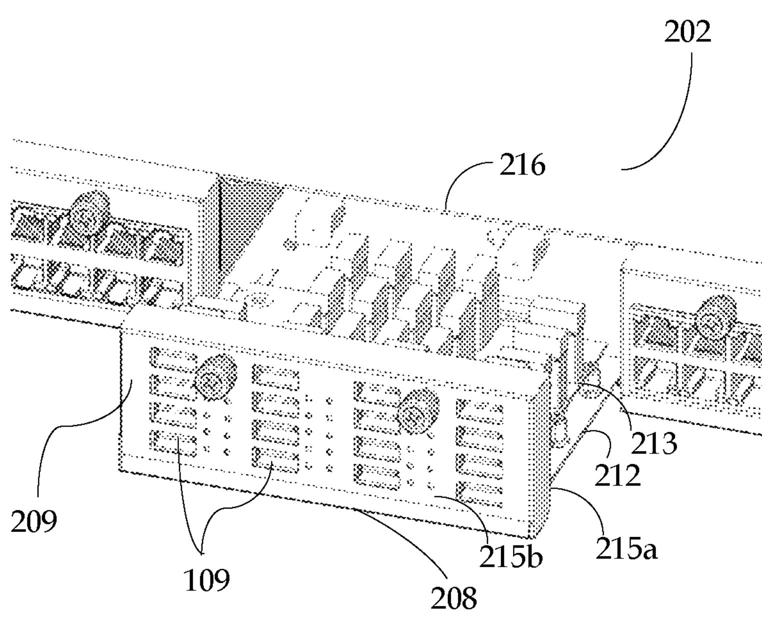
FIG. 2B shows an exemplary USB port module.

FIG. 2B shows an exemplary USB port module 209. USB port module 209 is being removably inserted into the housing 202 of IM system 101. USB port module 209 includes a carrier board 212, a storage expansion board 213 and a faceplate 208 with slots to accommodate 16 USB ports 109. It should be appreciated that any other number (e.g., 32) of USB ports 109 may also be provided. USB ports 109 may be physically coupled to multiple target servers 150 (e.g., 16) for concurrent debugging.

Faceplate 208 is disposed along one edge of the carrier board 212 and one edge of the storage expansion board 213. Faceplate 208 has an inner surface 215*a* and an outer surface 215*b*, wherein the inner and outer surfaces (215*a-b*) are parallel to each other. When the USB port module 209 is removably inserted into one or more modular slots of the housing 202, the inner surface 215*a* is aligned along and flush against (or directly adjacent to) the edge 216 of the housing 202, with the carrier board 212 and the storage expansion board 213 parallel to a base plate of the housing 202.

Figures 3A, 3B, 3C, 3D:
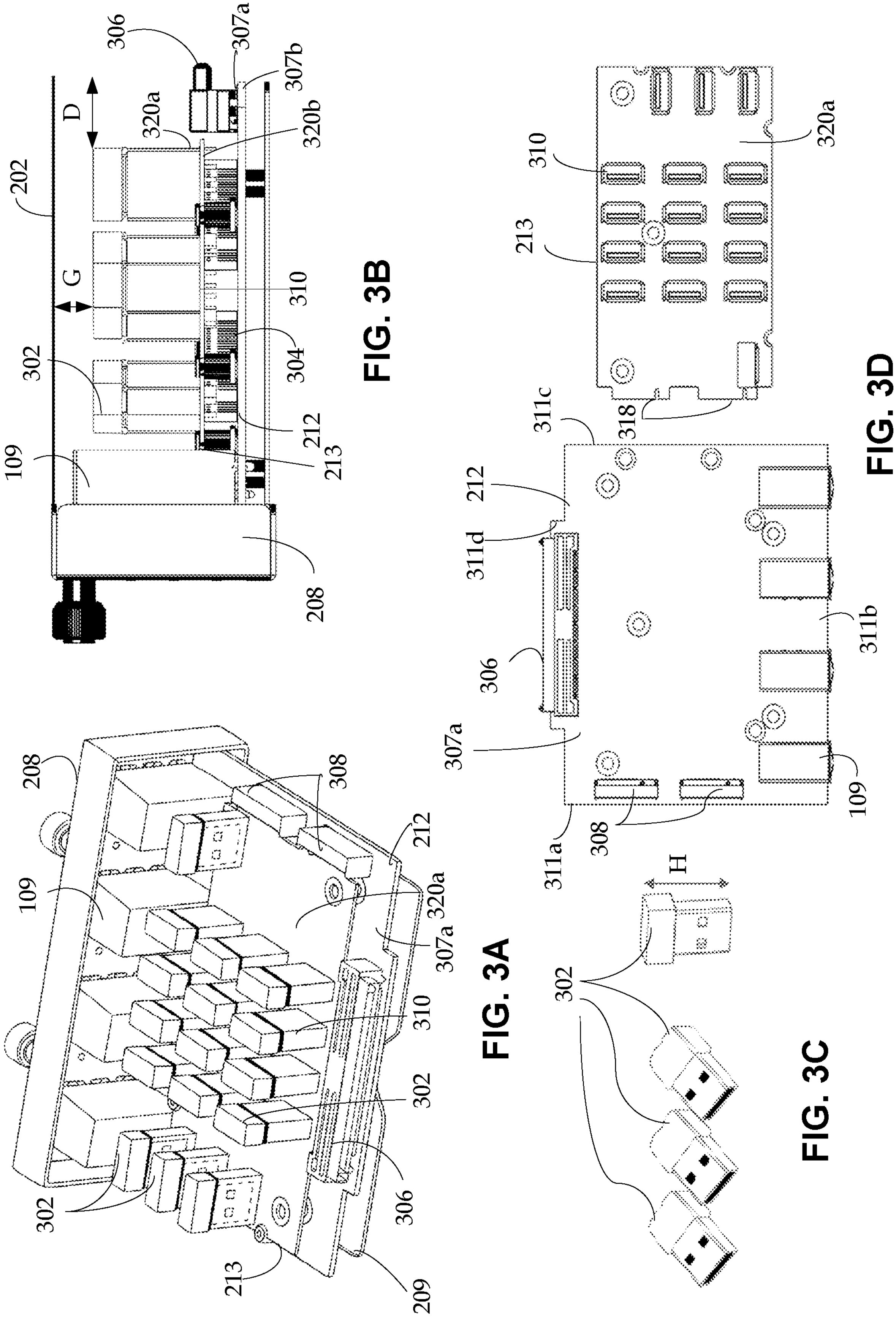
FIG. 3A illustrates the back view of an exemplary USB port module.
FIG. 3B illustrates the cross-sectional side view of an exemplary USB port module.
FIG. 3C shows exemplary USB storage devices.
FIG. 3D shows an exemplary carrier board and an exemplary storage expansion board.

FIG. 3A illustrates the back view and FIG. 3B illustrates the cross-sectional side view of exemplary USB port module 209. FIG. 3C shows exemplary USB storage devices 302, while FIG. 3D shows an exemplary carrier board 212 and an exemplary storage expansion board 213. USB port module 209 includes a carrier board 212, a storage expansion board 213 and a faceplate 208 with multiple USB ports 109. Carrier board 212 and storage expansion board 213 are arranged in parallel and perpendicularly to faceplate 208 and located within the housing 202. The clearance between the carrier board 212 and storage expansion board 213 is, for example, 6.6 mm.

Carrier board 212 may include necessary logic to function according to, for example, an OCP specification. In some implementations, carrier board 212 implements individual I2C (or IPMB) and UART functions of OCP debug ports for target servers 150 (e.g., OCP servers) through one or more USB ports 109, irrespective of the presence of storage expansion board 213. Carrier board 212 may connect the IM system 101 to one or more target servers 150 through one or more USB ports 109. Carrier board 212 includes an upper surface 307*a* and a lower surface 307*b* disposed opposite to the upper surface 307*a*. A logic circuit 304 may be disposed on the upper surface 307*a* and/or lower surface 307*b* of carrier board 212. Upper surface 307*a* includes first, second, third and fourth edges (311*a*, 311*b*, 311*c*, 311*d*), wherein the first and third edges (311*a*, 311*c*) are parallel to each other, and the second and fourth edges (311*b*, 311*d*) are parallel to each other. Second edge 311*b* is aligned along the faceplate 208.

In some implementations, at least one first connector 308 is disposed on upper surface 307*a* along the first edge 311*a* for connecting to storage expansion board 213, multiple USB ports 109 are disposed on upper surface 307*a* along second edge 311*b*, and at least one second connector 306 is on upper surface 307*a* disposed along fourth edge 311*d* for connecting to IM system 101. It should be appreciated that other configurations are also useful. Each of the two first connectors 308 includes an open slot that accommodates one end 318 of the storage expansion board 213 for electrical connection. USB ports 109 extend through slots in the faceplate 208 and may be electrically connected to target servers 150 via USB cables. USB ports 109 may serve as individual debug ports for concurrently debugging target servers 150. Additionally, each USB port 109 may be mapped to a unique logical device name. Second connector 306 may be accommodated by a connector in the IM system 101 for electrically connecting the carrier board 212 and the IM system 101.

Storage expansion board 213 facilitates the addition of internal storage (e.g., USB storage devices 302). Storage expansion board 213 includes an upper surface 320*a* and a lower surface 320*b* disposed opposite to the upper surface 320*a*. Edges 318 of storage expansion board 213 are electrically connected to the carrier board 212 via connectors 308. The size of storage expansion board 213 is smaller than the carrier board 212. The difference D between the length of the carrier board 212 and the length of the storage expansion board 213 may be, for example, 7.15 mm.

In some implementations, multiple USB ports 310 are disposed on the upper surface 320*a* for the storage expansion board 213 to accommodate removable USB storage devices 302. Each of the 16 USB port 310 corresponds to one of the 16 individual USB ports 109 provided by carrier board 212 to provide optional storage with, for example, dual mapping passthrough. If the user desires to add, replace or remove a USB storage device 302, the user may simply remove the USB port module 209 from the housing 202 of the IM system 101 and remove, add and/or insert a different USB storage device 302. Alternatively, storage devices 302 may be non-removably disposed (e.g., soldered or mounted) on the upper surface 320*a* and/or lower surface 320*b* of the storage expansion board 213. Although 16 USB ports 310 are shown, it should be appreciated that other number of USB ports may also be provided.

USB storage device 302 may be a micro-USB flash drive, a mini-USB flash drive (e.g., A-type, B-type, AB-type) or any other removable USB storage device. Advantageously, USB storage device 302 may be widely available in different storage sizes. The height H of the USB storage device 302 may be, for example, less than or equal to 18 mm. The gap G between the housing 202 of the IM system 101 and the top of the USB storage device 302 is, for example, around 7.15 mm. USB storage device 302 may include, for instance, a USB 2.0 storage device and/or USB 3.0 storage device capable of operating in accordance with a USB 2.0 standard. In some implementations, USB ports 310 disposed on the storage expansion board 213 are USB 2.0 Type A connectors to support USB 2.0 storage devices 302 and USB ports 109 disposed on carrier board 212 are USB 3.0 ports to support USB 3.0 target servers 150. In some implementations, USB ports 310 disposed on the storage expansion board 213 are USB 3.0 Type A connectors to support USB 3.0 storage devices 302 capable of operating in a USB 2.0 standard or USB 2.0 storage devices 302 and USB port 109 disposed on carrier board 212 are USB 3.0 ports to support USB 3.0 target servers 150.

In some implementations, storage expansion board 213 is not installed on the carrier board 212 and therefore no internal USB storage is available to target servers via the USB port 109. In other implementations, one or more of the USB ports 310 are left empty (i.e., without plugged-in USB storage devices 302) on the expansion board 213 connected to carrier board 212, and therefore no internal USB storage is available on the corresponding USB ports 109.

Each individual USB ports 310 of the USB port module 209 may operate in normal mode or passthrough mode. The normal mode and passthrough mode may be selected via, for example, a user interface 142 on user device 140, or programmatically via a process (e.g., automation script) running on IM system 101. During the normal mode, USB port 310 functions as a client USB device connected to IM system 101, which functions as a USB host. A user may access the internal USB storage device 302 on the USB port 310 via the IM system 101 to, e.g., format, copy, update and/or read files. For instance, the user may transfer a file (e.g., a bootable image of a target server 150) to the internal USB storage device 302. This file may be previously stored on the one or more non-transitory computer-readable media 104, or remotely transferred (e.g., over a network) from a remote client user device 140.

During passthrough mode, the target server 150 functions as a USB host. Target server 150 connected to USB port 109 may access the internal USB storage device 302 on the USB port 310, as if it is directly connected to the target server 150. This enables further configuration of the target server 150. One example is to access the BIOS of the target server 150 and configure the target server 150 to boot directly from new firmware (or file) stored on internal USB storage device 302 on the USB port 310, which is available via passthrough mode. In another example, information such as log data, sensor data, event data or baseboard management data may be transferred from the target server 150 to the USB storage device 302 on the USB port 310.

Figure 4A:
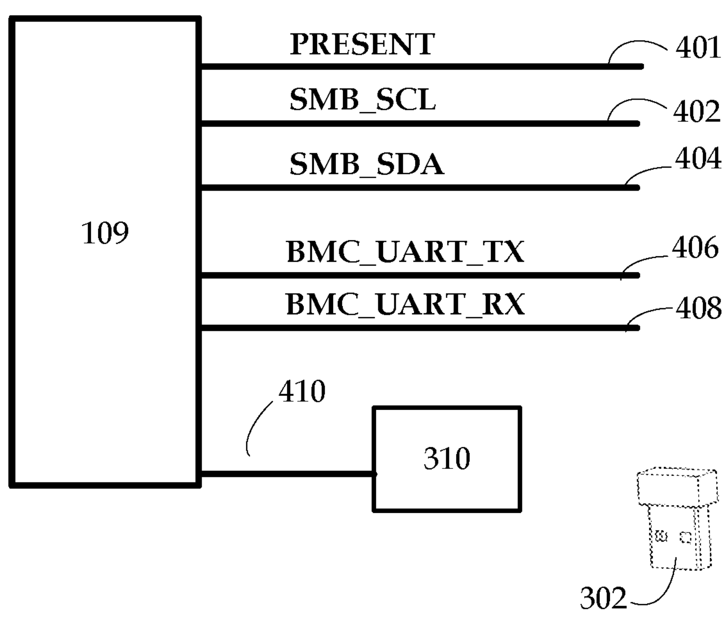
FIG. 4A shows an exemplary USB port provided by an exemplary USB port module.

FIG. 4A shows an exemplary USB port 109 provided by an exemplary USB port module 209. In some implementations, USB port 109 is a USB 3.0 type A connector that has 9 connection terminals (or pins) for communicating 9 signals. It should be appreciated that other connector types may also be used. Logic circuit 304 in USB port module 209 remaps USB 3.0 signals to OCP-compatible signals. The remapping may be enabled (or disabled) by the PRESENT signal 401 independently on each individual USB port 109. In some implementations, when remapping is enabled, each USB port 109 may support individual inter-integrated circuit (I2C) bus (e.g., intelligent platform management bus or IPMB) signals (402, 404) that enable non-blocking communications between the IM system 101 and target server 150 and individual UART signals (406, 408) that enable non-blocking communication of console data between the IM system 101 and target server 150. Regardless of the state of the PRESENT signal 401, the remaining 4 signals 410 may be communicated to an optional internal USB 2.0 storage device 302 removably inserted into USB port 310.

Figure 4B:
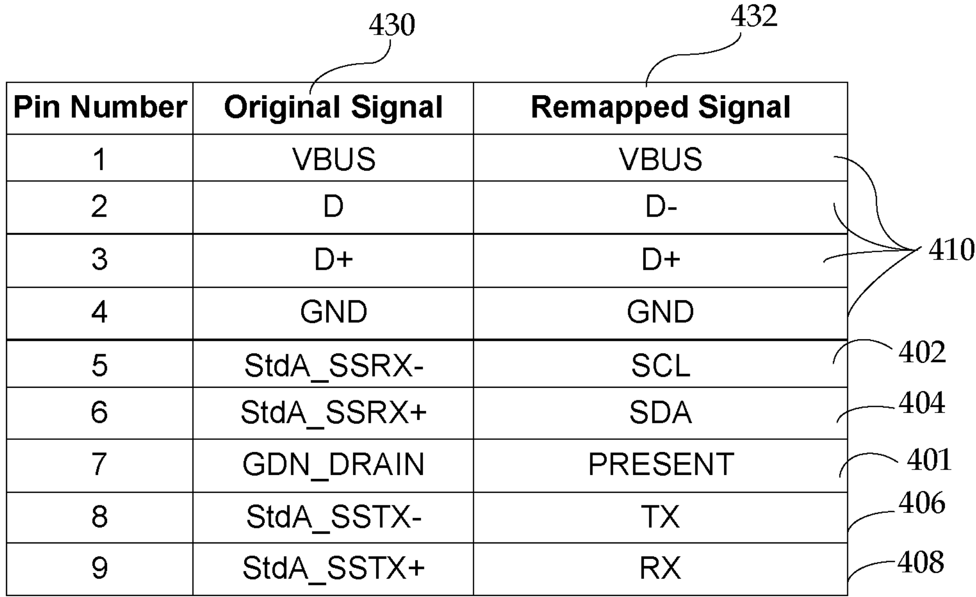
FIG. 4B shows an exemplary remapping table for an exemplary USB port.

FIG. 4B shows an exemplary remapping table for an exemplary USB port 109. USB port 109 includes 9 pins for receiving USB 3.0 signals 430 that are remapped to OCP-compatible signals 432. Four signals passing through the USB port 109 may be remapped to two inter-integrated circuit (I2C) bus signals (402, 404) and two universal asynchronous receiver-transmitter (UART) signals (406, 408). The two I2C bus signals (402, 404) enable communication between the processor 105 (in IM system 101) and the target server 150. First bus signal 402 may be a serial clock (SCL) signal, while second bus (SDA) signal 404 may be a serial data signal. The two UART signals (406, 408) pass console data between the target server 150 and the IM system 101. First signal 406 may be a UART transmitter (TX) signal, while second signal 408 may be a UART receiver (RX) signal. The remaining 4 signals 410 may pass to the USB ports 310 disposed on the storage expansion board 213.

Figure 5:
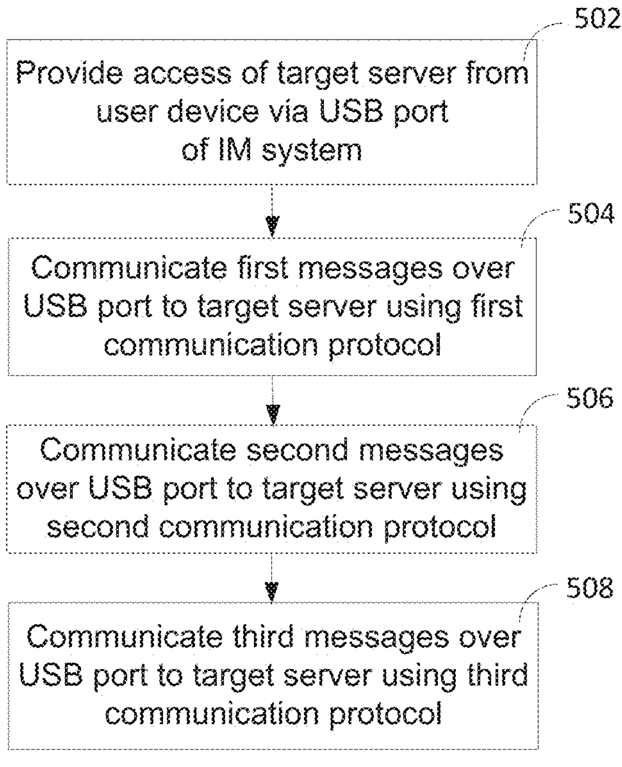
FIG. 5 shows an exemplary method of using the USB port module.

FIG. 5 shows an exemplary method 500 using the USB port module 209. It should be understood that the steps of the method 500 may be performed in the order shown or a different order. Additional, different, or fewer steps may also be provided. Further, the method 500 may be implemented with the system and devices described with reference to FIGS. 1, 2A, 2B, 3A, 3B, 3C, 3D, 4A and 4B, a different system or device, or a combination thereof.

At 502, access of the target server 150 from user device 140 is provided via USB port 109 of IM system 101. IM system 101 includes first and second communication modules (106*a-b*). User device 140 may be directly communicatively coupled to the first communication module 106*a*. Alternatively, user device 140 is indirectly communicatively coupled to the first communication module 106*a* via a cloud-computing platform 145 to enable remote access, since IM system 101 may be placed in a location (e.g., branch office) that is remote from user device 140. Second communication module 106*b* includes at least one USB port 109. Target server 150 may be communicatively coupled to the second communication module 106*b* via the USB port 109. Second communication module 106*b* may include a high density of USB ports 109 (e.g., 16, 32, 64) coupled to multiple target servers 150.

In some implementations, access of target server 150 is provided via a user interface 142 at user device 140. User interface 142 may be used to interact with management engine 110 and/or access and control engine 112 of IM system 101. User interface 142 may be a graphical user interface (e.g., web browser), a command line interface (CLI), or a combination thereof. Access may be performed to manage, control and/or configure IT devices (e.g., target server 150) managed by IM system 101. It should be appreciated that user device 140 may also be an IT device operating autonomously without a user and/or user interface. Access of the target server 150 may be provided by a process (e.g., automation script) running on IM system 101 while user device 140 is directly communicatively coupled to the first communication module 106*a*. Such user device 140 may be, for example, an automation server, a data log server, a notification server, an event server or any other IT device.

Figure 6A:
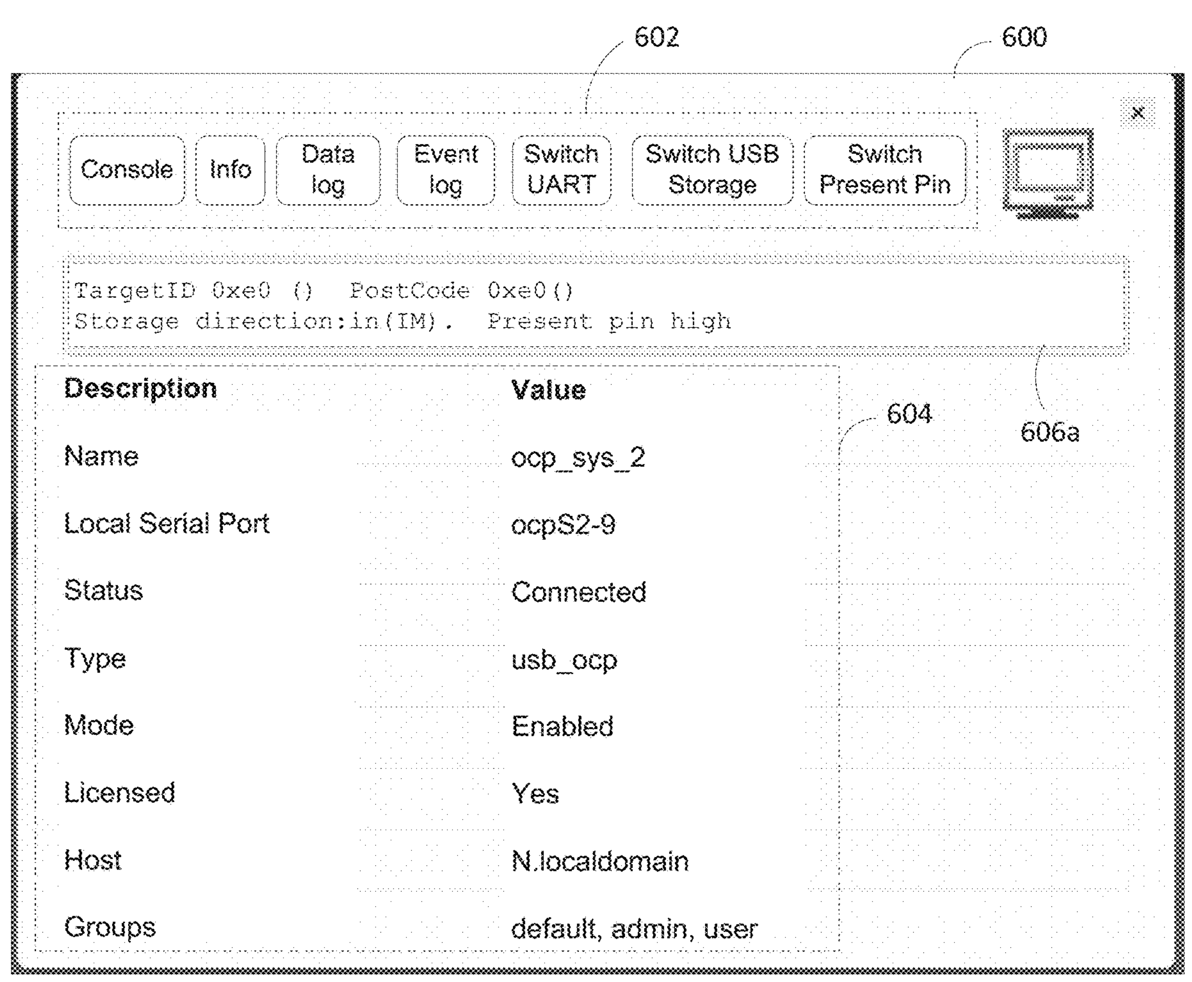
FIG. 6A shows an exemplary graphical user interface screen for managing device access.

FIG. 6A shows an exemplary graphical user interface screen 600 for managing device access via USB port 109. Graphical user interface screen 600 may be generated by access and control engine 112 in IM system 101 and displayed on user device 140 via a web browser. A set of user interface elements (e.g., buttons) 602 are provided to enable the user to access various functions. In some implementations, the functions include, but are not limited to, "console", "info", "data log", "event log", "switch UART", "switch USB storage" and "switch present pin."

The "console" function displays a text-based interface in response to user selection of the function. The text-based interface exchanges commands and/or messages between user device 140 and target server 150 via the first communication module 106*a*, access and control engine 112, second communication module 106*b*, USB port 109 and UART signals (406, 408) in IM system 101. The "info" function displays information 604 associated with the target server 150 connected to the USB port 109. As shown, the information 604 may include, but is not limited to the name, local serial port, connection status, type, mode, licensed status, host, groups or a combination thereof. Additional status information of the USB port 109 (e.g., TargetId, postcode, storage direction, present pin) may also be displayed in information text box 606*a*.

In some implementations, "TargetID" indicates which console port of target server 150 is connected to UART signals (406, 408). For example, target server 150 may include a baseboard console (e.g., BMC) and one or more servers consoles (e.g., slot1) multiplexing the same UART signals (406. 408). In some implementations, "PostCode" indicates a Basic Input Output System (BIOS) output code (e.g., BIOS under debug mode). "Storage direction" may indicate where the USB storage device 302 on the USB port 310 is connected to. For example, "in (IM)" may indicate that IM system 101 is the USB host for the USB storage device 302 and "out(port)" may indicate that the target server 150 is the USB host for the USB storage device 302. Additionally, "Present pin" may indicate the logical status (e.g., high or low) of PRESENT signal 401.

FIG. 6B shows an exemplary data log 620 that is displayed at user device 140 in response to the "data log" function being enabled by the user. The "data log" function may display a record of output console messages (e.g., UART messages) from the USB port 109. Access and control engine 112 may collect the output console messages even if no user session is established. In some implementations, the data log may be stored in a local file on the IM system 101, in a remote file on the network, in a log system (e.g. SYSLOG) on the network and may include the reference to selected UART (e.g., BMC, slot or host) and/or date and time. Since it captures the UART output, passwords may not be recorded.

FIG. 6C shows an exemplary event log 630 that is displayed at user device 140 when "event log" function is enabled by the user. The "event log" function displays a record of output from the OCP display frames collected by access and control engine 112 via the second communication module 106*b*, USB port 109 and inter-integrated circuit (I2C) bus (e.g., IPMB) signals (402, 404) in IM system 101 from the target server 150. The display frames may include, but is not limited to, information related to the baseboard status, sensor data, system power status, firmware version, or a combination thereof. The history of all display frame changes may be preserved. In some implementations, processor 105 runs a process loop. On every loop, if a display frame is updated, its content is recorded in the event log file. The event log file may record, for example, the timestamp, frame type and content of the updated display frame.

Figure 6D:
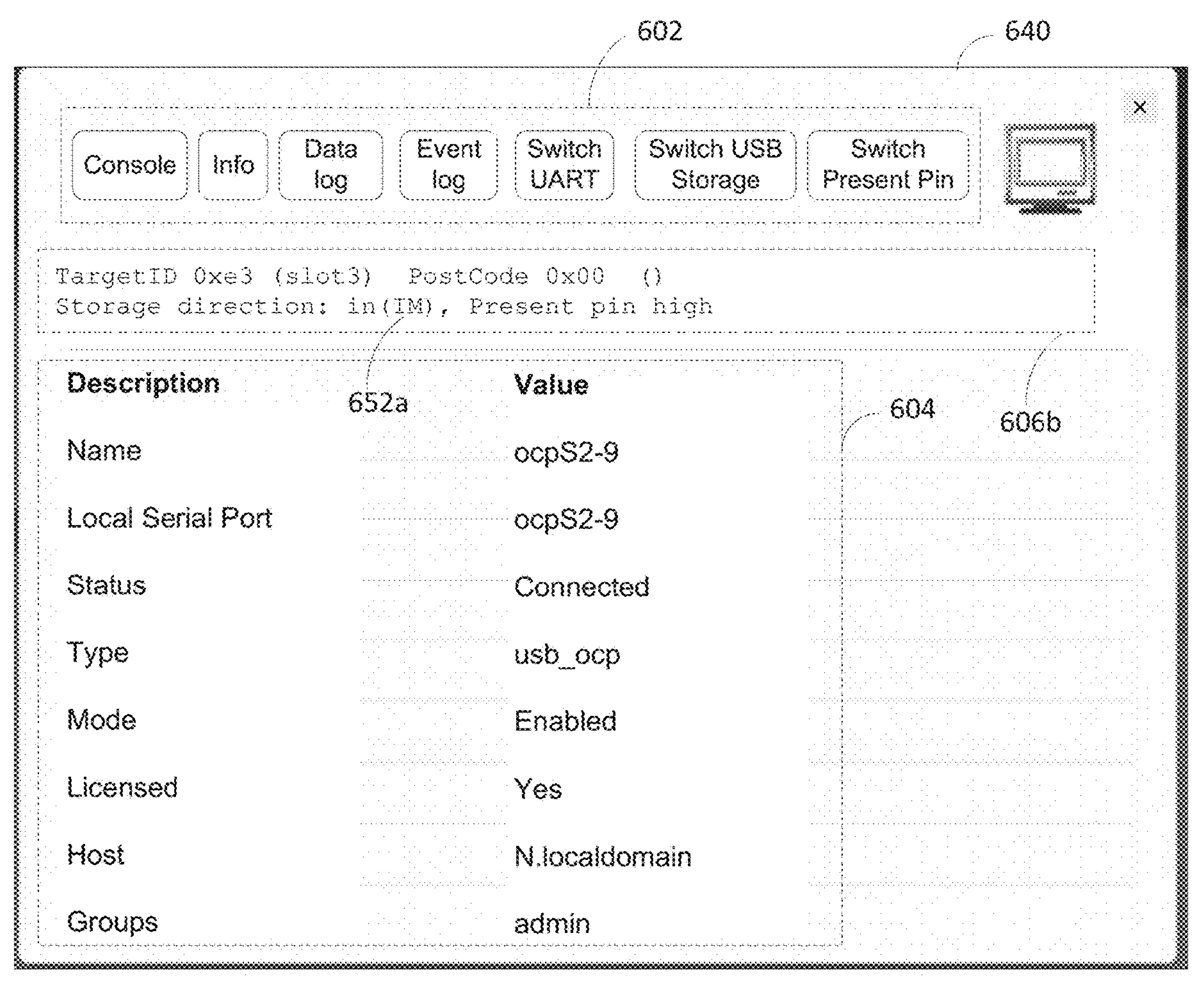
FIG. 6D shows an exemplary user interface screen when "switch UART" function is enabled by the user.

FIG. 6D shows an exemplary user interface screen 640 that is displayed at user device 140 when "switch UART" function is enabled by the user. The "switch UART" function allows the user to toggle the UART between one or more hosts and BMC console ports (e.g., console port of BMC, slot1, slot3, description N.A.) in a circular fashion. For example, by first selecting "switch UART" function, BMC may be selected as the console port. Subsequently, by selecting "switch UART" function, slot1 may be selected as host. Consequently, by toggling the "switch UART" function, either BMC or slot1 may be selected. In response to the selection of the UART, the "console" function operates in associated with the selected UART. For example, the "switch UART" function may select slot1 as console port (or host). Any subsequent access to the "console" function and any output console messages collected by the access and control engine 112 will be related to slot1.

Figure 6E:
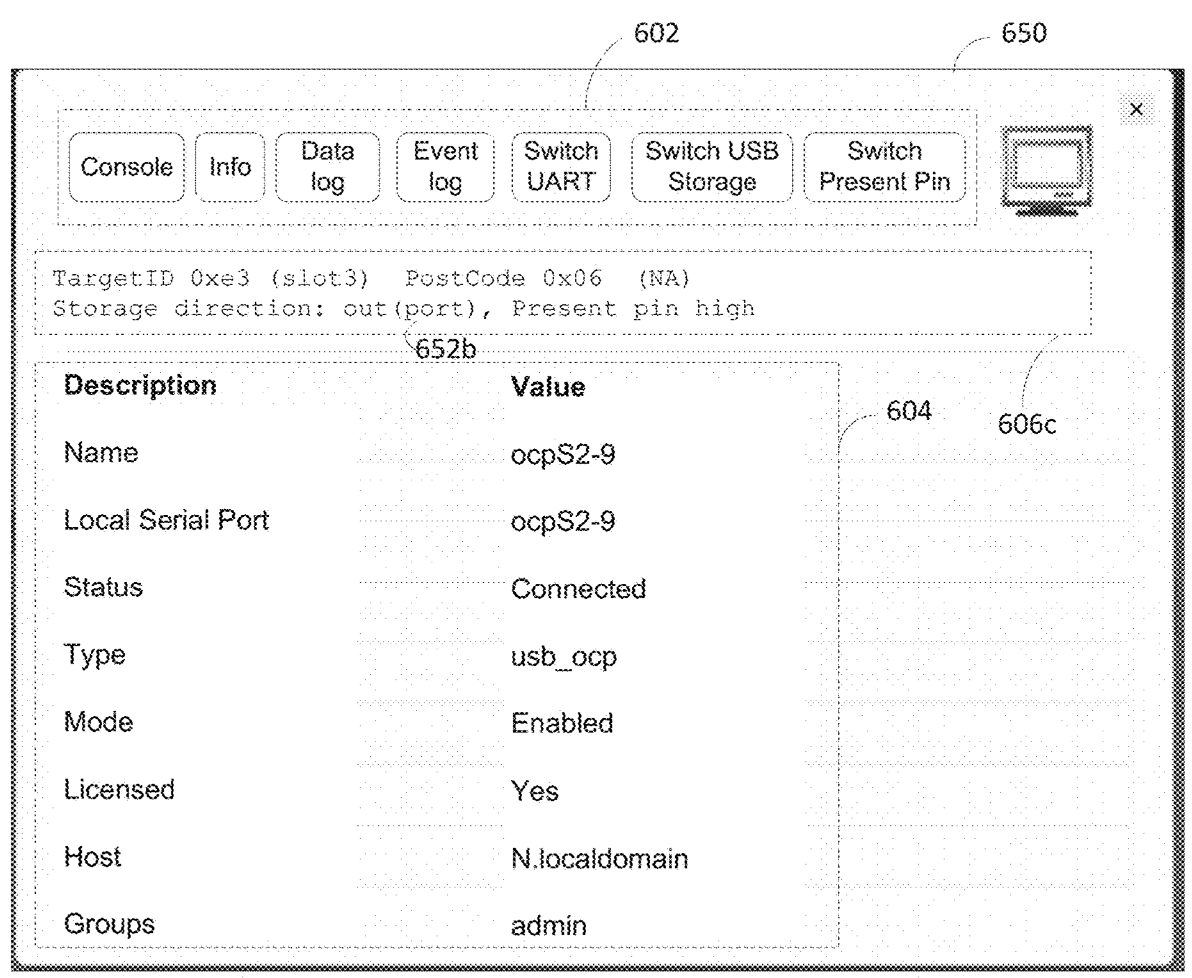
FIG. 6E shows an exemplary user interface screen when "switch USB storage" function is enabled by the user.

FIG. 6E shows an exemplary user interface screen 650 that is displayed at user device 140 when "switch USB storage" function is enabled by the user. The "switch USB storage" function changes the storage direction. As indicated by the text 652*b* in the information text box 606*c*, the storage direction may change to "out (port)." Setting "switch USB storage" as "out (port)" may configure target server 150 as the USB host for the USB storage device 302. Alternatively, as shown in FIG. 6D, the storage direction may change to "in (IM)" as indicated by text 652*a* in the information text box 606*b*, Setting "switch USB storage" as "in (IM)" may configure that IM system 101 as the USB host for the USB storage device 302.

Figure 6F:
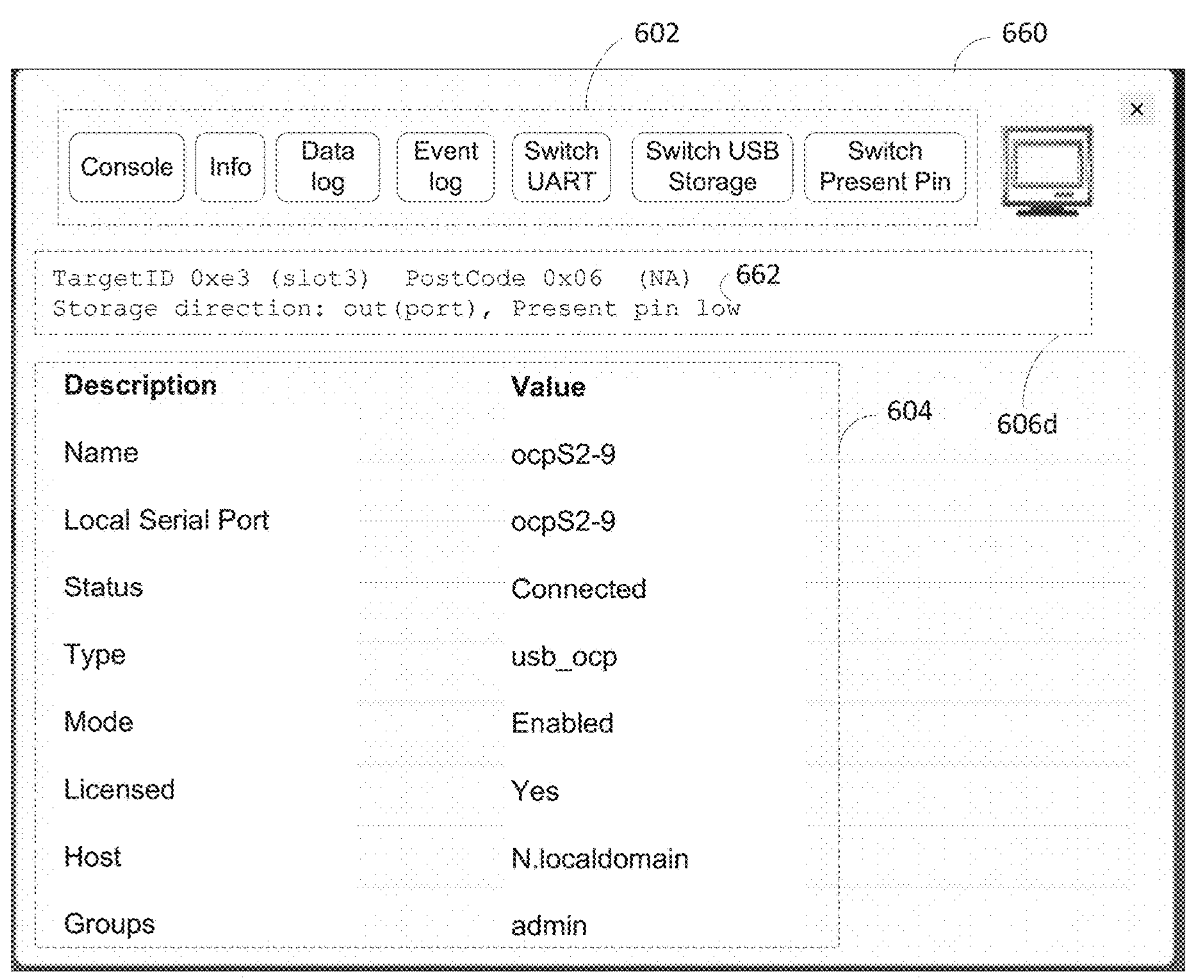
FIG. 6F shows an exemplary user interface screen when "switch present pin" function is enabled by the user.

FIG. 6F shows an exemplary user interface screen 660 that is displayed at user device 140 when "switch present pin" function is enabled by the user. The "switch present pin" function switches the level of the PRESENT signal 401 of the USB port 109. As indicated by the text 662 in the information text box 606*d*, the level of the present pin may be changed to "low." Alternatively, the level of the present pin may be changed to "high."

FIG. 7 shows an exemplary command-line interface (CLI) 702 for managing, accessing and controlling a target server 150 via USB port 109. Command-line interface (CLI) 702 may be displayed on user device 140 and provides an alternative text-based interface for managing, accessing and controlling a target server 150 via USB port 109 in IM system 101, with similar capabilities available via graphical user interface screen 600 as shown in FIG. 6A.

Figures 8A, 8B:
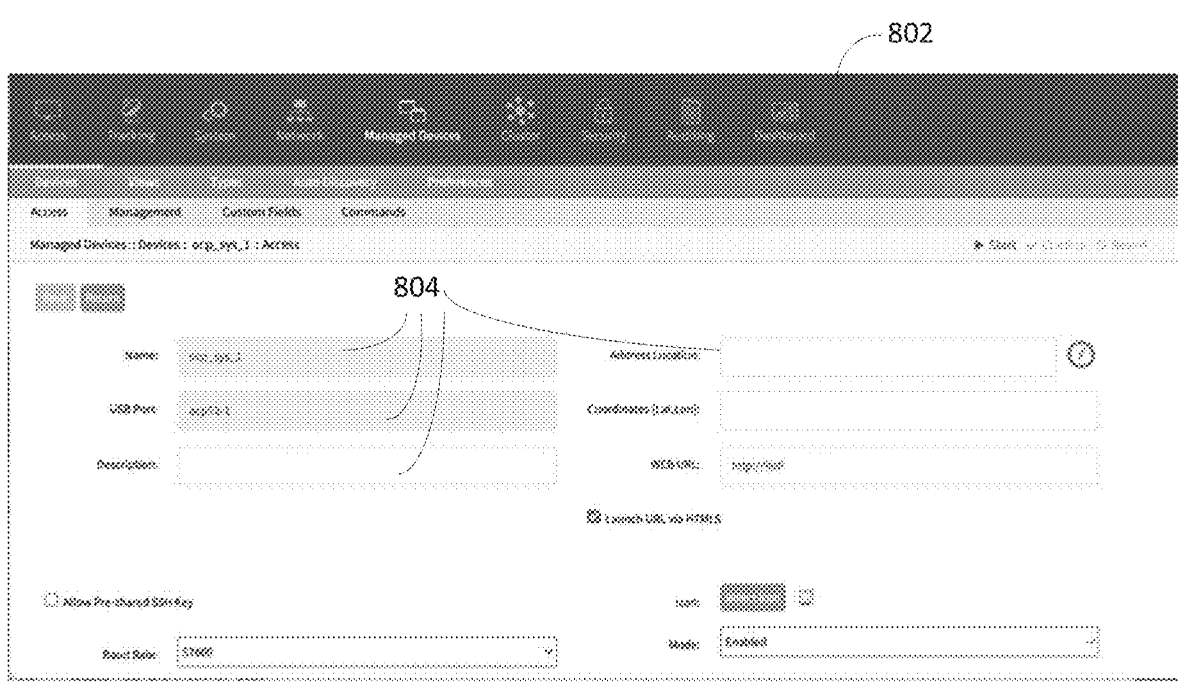
FIG. 8A shows an exemplary graphical user interface screen for configuring IT devices.
FIG. 8B shows another exemplary graphical user interface screen for device configuration.

FIG. 8A shows an exemplary graphical user interface screen 802 for configuring IT devices communicatively coupled to IM system 101. Graphical user interface screen 802 may be generated by management engine 110 in IM system 101 and displayed on user device 140 via a web browser. A set of user interface elements (e.g., text input boxes) 804 are displayed on graphical user interface screen 802 to enable the user to define various attributes of an IT device (e.g., target server 150) managed by management engine 110 in IM system 101. In some implementations, the attributes include, but are not limited to, name, USB port corresponding to the IT device, address location, coordinates, description, Web uniform resource locator (URL), baud rate, mode, or a combination thereof.

FIG. 8B shows another exemplary graphical user interface screen 806 for device configuration. Graphical user interface screen 806 may be generated by management engine 110 in IM system 101 and displayed on user device 140 via a web browser. Graphical user interface screen 806 may display a list 808 of IT devices (e.g., target server 150) managed by management engine 110. The list 808 may include attributes associated with the managed IT devices. A set of user interface elements 810 (e.g., interactive buttons) may be provided to enable the user to perform various management functions for an IT device, including but not limited to, adding, editing, deleting, renaming, cloning, enabling, disabling, enabling, setting on-demand attribute, setting attributes to default values, or a combination thereof.

FIG. 9 shows an exemplary command-line interface (CLI) 902 for device configuration. Command-line interface (CLI) 902 may be displayed on user device 140 and provides an alternative text-based interface for configuring IT devices communicatively coupled to IM system 101.

Returning to FIG. 5, at 504, management engine 110 communicates first messages over USB port 109 to target server 150 using a first communication protocol. A "communication protocol" as used herein refers to a system of standardized rules that allows two entities of a communication system to transmit information. In some implementations, the first communication protocol is an inter-integrated circuit (I2C) bus protocol, such as the intelligent platform management bus (IPMB) protocol. The I2C bus protocol is a synchronous, multi-master/multi-slave (controller/target), packet switched, single-ended, serial communication bus protocol that provides a standardized interconnection between different boards within a chassis. The first messages may include a serial clock signal message and a serial data signal message.

At 506, management engine 110 communicates second messages over USB port 109 to target server 150 using a second communication protocol. In some implementations, the second communication protocol is a Universal Asynchronous Receiver/Transmitter (UART) protocol. A UART protocol is a device-to-device communication protocol that uses asynchronous serial communication with configurable speed. Instead of a clock signal, the transmitting UART adds start and stop bits to the data packet being transferred. These bits define the beginning and end of the data packet so the receiving UART knows when to start reading the bits.

At 508, management engine 110 communicates third messages over USB port 109 to target server 150 using a third communication protocol. In some implementations, the third communication protocol is a USB 2.0 protocol. USB 2.0 messages may be to and/or from internal USB 2.0 storage devices 302 located in USB port module 209.

As discussed previously, USB port module 209 may operate in normal mode or passthrough mode. During the normal mode, USB port 310 functions as a client USB device connected to IM system 101, which functions as a USB host. For instance, USB 2.0 messages (e.g., a bootable image of a target server 150) may be communicated from user device 140 to the internal USB storage device 302. During passthrough mode, the target server 150 functions as a USB host. Target server 150 connected to USB port 109 may access the internal USB storage device 302 on the USB port 310, as if it is directly connected to the target server 150. This enables further configuration of the target server 150. USB 2.0 messages may be communicated via the USB port 109 directly from the internal USB storage device 302 to target server 150 to enable it to boot directly from new firmware (or file) stored on the internal USB storage device 302.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the presently described embodiments are discussed with respect to a data center. However, one skilled in the art will recognize that embodiments may be employed to other collections of IT devices over, for example, a distributed network not confined by a single data center, a small collection of IT devices in an Intranet, combinations thereof, and/or the like.

What is claimed is:

1. An infrastructure management system, comprising:

a first communication module communicatively coupled to a user device, wherein the user device provides access by a user to a target server communicatively coupled to the infrastructure management device, wherein the user device and the target server are external to the infrastructure management system;

a second communication module including a second communication module universal serial bus (USB) port, wherein the second communication module USB port is communicatively coupled to the target server;

one or more non-transitory computer-readable media for storing computer-readable program code; and a processor in communication with the second communication module USB port and the one or more non-transitory computer-readable media, wherein the processor is operative with the computer-readable program code to perform operations including communicating one or more first messages over the second communication module USB port to the target server using an inter-integrated circuit (I2C) bus protocol, communicating one or more second messages over the second communication module USB port to the target server using a universal asynchronous receiver-transmitter (UART) protocol, and communicating one or more third messages over the second communication module USB port to the target server using a USB 2.0 protocol.

2. The infrastructure management system of claim 1 wherein the first communication module is directly communicatively coupled to the user device.

3. The infrastructure management system of claim 1 wherein the first communication module is indirectly communicatively coupled to the user device via a network for remote access of the target server.

4. The infrastructure management system of claim 1 wherein the second communication module comprises multiple second communication module USB ports communicatively coupled to multiple target servers.

5. The infrastructure management system of claim 1 wherein the first and second communication modules are removably inserted into a housing.

6. The infrastructure management system of claim 5 wherein the second communication module comprises a storage expansion board located within the housing to accommodate one or more USB storage devices.

7. The infrastructure management system of claim 6 wherein the one or more USB storage devices are removably disposed in one or more USB ports on the storage expansion board.

8. The infrastructure management system of claim 6 wherein the one or more USB storage devices are non-removably disposed on the storage expansion board.

9. The infrastructure management system of claim 6 wherein the one or more USB storage devices comprises one or more USB 2.0 storage devices.

10. A method, comprising:

providing access to a target server from a user device via a universal serial bus (USB) port of an infrastructure management (IM) system, wherein the IM system includes first and second communication modules, wherein the user device is communicatively coupled to the first communication module and the target server is communicatively coupled to the second communication module via the USB port, which comprises a second communication module USB port of the second communication module;

communicating one or more first messages over the second communication module USB port to the target server using a first communication protocol; and communicating one or more second messages over the second communication module USB port to the target server using a second communication protocol, wherein the first and second communication protocols are different protocols.

11. The method of claim 10 wherein the first communication protocol comprises an inter-integrated circuit (I2C) bus protocol.

12. The method of claim 10 wherein the second communication protocol comprises a universal asynchronous receiver-transmitter (UART) protocol.

13. The method of claim 10 further comprising communicating one or more third messages over the USB port to the target server using a third communication protocol.

14. The method of claim 13 wherein the third communication protocol comprises a USB 2.0 protocol.

15. The method of claim 13 wherein communicating the one or more third messages over the USB port to the target server using the third communication protocol comprises communicating one or more USB 2.0 messages from an internal storage device to the target server, wherein the internal storage device is located in the second communication module within a housing of the IM system.

16. The method of claim 10 wherein providing access to the target server from the user device comprises providing remote access to the target server via a cloud-computing platform.

17. The method of claim 10 wherein providing access of the target server from the user device comprises providing a user interface at the user device for user input.

18. The method of claim 10 further comprising mapping the USB port to a unique logical device name.

19. The method of claim 10 further comprising communicating one or more third messages from the user device to an internal USB 2.0 storage device located in the second communication module within a housing of the IM system.

20. One or more non-transitory tangible machine-readable media comprising instructions configured to cause at least one processor on at least one infrastructure management system to perform a process comprising:

providing access to a target server from a user device via a USB port of an IM system, wherein the IM system includes first and second communication modules, wherein the user device is communicatively coupled to the first communication module and the target server is communicatively coupled to the second communication module via the USB port, which comprises a second communication module USB port of the second communication module;

communicating one or more first messages over the second communication module USB port to the target server using a first communication protocol; and communicating one or more second messages over the second communication module USB port to the target server using a second communication protocol, wherein the first and second communication protocols are different protocols.

* * * * *